(12) United States Patent
Kwak et al.

(10) Patent No.: US 10,913,515 B2
(45) Date of Patent: Feb. 9, 2021

(54) MOORING DEVICE FOR VESSEL USING SPRING BELLOWS STRUCTURE

(71) Applicant: KOREA INSTITUTE OF OCEAN SCIENCE & TECHNOLOGY, Busan (KR)

(72) Inventors: Hyun Uk Kwak, Seoul (KR); Jae Sang Jung, Seoul (KR); Dong Woo Jung, Daejeon (KR); Byung Won Park, Seoul (KR); In Bo Park, Daejeon (KR); Suk Kyu Cho, Daejeon (KR); Dong Ho Jung, Daejeon (KR); Hong Gun Sung, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 0 days.

(21) Appl. No.: 16/613,778

(22) PCT Filed: May 29, 2018

(86) PCT No.: PCT/KR2018/006100
§ 371 (c)(1),
(2) Date: Nov. 14, 2019

(87) PCT Pub. No.: WO2018/221937
PCT Pub. Date: Dec. 6, 2018

(65) Prior Publication Data
US 2020/0407023 A1    Dec. 31, 2020

(30) Foreign Application Priority Data

May 31, 2017 (KR) .................. 10-2017-0067931

(51) Int. Cl.
*B63B 21/00*    (2006.01)
*B63B 21/56*    (2006.01)
(Continued)

(52) U.S. Cl.
CPC .............. *B63B 21/56* (2013.01); *E02B 3/20* (2013.01); *G06T 7/337* (2017.01);
(Continued)

(58) Field of Classification Search
CPC ... B63B 21/00; B63B 21/56; B63B 2021/001; B63B 2021/005; B63B 2221/22; G06T 7/337; E02B 3/20
See application file for complete search history.

(56) References Cited

U.S. PATENT DOCUMENTS 6,439,147 B2 *  8/2002  Cottrell .................. B63B 21/00
                                                      114/230.19
9,308,969 B2 *  4/2016  McEvoy ................. B63B 21/20
(Continued)

FOREIGN PATENT DOCUMENTS

CN    104260830 A    1/2015
JP    55-079785 A    6/1980
(Continued)

OTHER PUBLICATIONS

International Search Report of corresponding PCT Application No. PCT/KR2018/006100—4 pages (dated Aug. 27, 2018).
(Continued)

*Primary Examiner* — S. Joseph Morano
*Assistant Examiner* — Jovon E Hayes
(74) *Attorney, Agent, or Firm* — Knobbe Martens Olson & Bear LLP

(57) ABSTRACT

The present invention provides a ship mooring device using a spring bellows structure, wherein the ship mooring device temporarily or permanently fixes a state in which the ship is spaced at a preset distance from a vessel or a pier, the ship mooring device including: a main body configured of a plurality of frames in which opposite ends of each of the frames are hinge-coupled to facing ends of adjacent frames
(Continued)

to form foldable hinge joints, wherein diagonally opposed non-adjacent hinge joints of the frames are fixed to the ship and the pier, respectively; and a plurality of wires which are installed inwards in diagonal lines with respect to the frames of the main body to connect the diagonally opposed non-adjacent hinge joints together, with an elastic member interposed in a center portion of the radially disposed wires to generate predetermined dynamic stability when the ship is moved.

10 Claims, 15 Drawing Sheets

(51) Int. Cl.
  *E02B 3/20* (2006.01)
  *G06T 7/33* (2017.01)
(52) U.S. Cl.
  CPC ... *B63B 2021/001* (2013.01); *B63B 2021/005* (2013.01); *B63B 2221/22* (2013.01)

(56) References Cited

U.S. PATENT DOCUMENTS

| | | | | |
|---|---|---|---|---|
| 2004/0237869 | A1* | 12/2004 | Poldervaart | B63B 21/00 114/230.17 |
| 2007/0289518 | A1* | 12/2007 | Lawson | B63B 21/00 114/230.27 |
| 2009/0202306 | A1* | 8/2009 | Huang | E02D 5/74 405/224 |
| 2010/0101474 | A1* | 4/2010 | McEvoy | F03B 13/18 114/230.24 |
| 2010/0308589 | A1* | 12/2010 | Rohrer | F03B 13/188 290/53 |
| 2010/0308590 | A1* | 12/2010 | Rohrer | F03B 13/188 290/53 |
| 2011/0011322 | A1* | 1/2011 | Phillips | B63B 21/04 114/230.22 |
| 2013/0167764 | A1* | 7/2013 | Zucco | B63B 21/00 114/230.16 |

FOREIGN PATENT DOCUMENTS

| | | |
|---|---|---|
| JP | 2008-007072 A | 1/2008 |
| KR | 10-1985-0000334 B1 | 3/1985 |
| KR | 10-2010-012214 A | 2/2010 |
| KR | 10-2013-0054524 A | 5/2013 |
| KR | 10-2015-0035018 A | 4/2015 |

OTHER PUBLICATIONS

Decision to Grant dated Feb. 27, 2018 in Korean Application No. 10-2017-0067931.

* cited by examiner

MOORING DEVICE FOR VESSEL USING SPRING BELLOWS STRUCTURE

TECHNICAL FIELD

The present invention relates to a ship mooring device using a spring bellows structure. More particularly, the present invention relates to a ship mooring device, which is configured to connect a ship and a pier together using a plurality of frames, wherein the frames are foldable using a spring bellows structure and has dynamic stability acting in both contractile and tensile directions. Accordingly, the ship mooring device is easily installed in a narrow space and more firmly moors a ship.

BACKGROUND ART

Generally, when a very large floating structure is transferred a short distance, or mooring in which a ship is temporarily or permanently spaced from a pier at a preset distance, a tugboat or a separate mooring device is used.

For example, the tugboat directly pushes or pulls a floating structure for transferring or mooring. At this time, a support or a mooring post is installed in the floating structure so that a towing force is applied to the floating structure.

Meanwhile, as described above, there is frequent contact between a floating structure and a tugboat or a vessel.

When the tugboat reaches the floating structure, the tugboat has access to a side of the floating structure. During this process, the tugboat may pitch due to high waves and collide with the floating structure. Accordingly, a protective fender is provided at the floating structure for protecting the floating structure from the collision.

Conventionally, in the floating structure, the support, the mooring post, and the protective fender having each function as described above are installed dispersively.

That is, the support and the mooring post for mooring the tugboat are provided as independent structures. In addition, the protective fender having a separate function is dispersively provided at the floating structure as one independent structure.

Accordingly, it is inefficient in terms of space utilization of a narrow floating structure, and inefficient in terms of utilization of each structure (the support, the mooring post, and the protective fender) since each structure is used only for a specific purpose.

DISCLOSURE

Technical Problem

The present invention has been made keeping in mind the above problems occurring in the related art, and the present invention is intended to propose a ship mooring device using a spring bellows structure. Wherein the ship mooring device is configured to connect a ship and a pier together using a plurality of frames, which are foldable using the spring bellows structure and has dynamic stability acting in both contractile and tensile directions. Thus the ship mooring device may be easily installed in a narrow space and more firmly moor a ship.

Another objective of the present invention is to provide a ship mooring device using a spring bellows structure. Wherein the ship mooring device is configured to easily set initial tension with respect to dynamic stability thus freely control a mooring force in response to specifications of various ships to be moored. The ship mooring device is configured to sense the variation of tension and movements of the frames in real time, and to obtain a variety of ocean information and information about separation of the ship using sensed results, thus increasing the utilization and being applicable to the model test.

Technical Solution

In order to accomplish the above object, the present invention provides a ship mooring device using a spring bellows structure, wherein the ship mooring device temporarily or permanently fixes a state in which the ship is spaced at a preset distance from a vessel or a pier, the ship mooring device includes: a main body configured of a plurality of frames in which opposite ends of each of the frames are hinge-coupled to facing ends of adjacent frames to form foldable hinge joints, wherein diagonally opposed non-adjacent hinge joints of the frames are fixed to the ship and the pier, respectively; and a plurality of wires which are installed inwards in diagonal lines with respect to the frames of the main body to connect the diagonally opposed non-adjacent hinge joints together, with an elastic member interposed in a center portion of the radially disposed wires to generate predetermined dynamic stability when the ship is moved. Wherein the plurality of wires is provided to connect the diagonally opposed non-adjacent hinge joints together, and generates the dynamic stability in a manner that, while crossing at different heights from each other, some of the wires extend and the remaining wires contract.

The hinge joints of the main body may be manufactured in ball joint structures.

The ship mooring device may include: a tension-setting unit installed at each of the wires along a longitudinal direction thereof in a self-length adjustable manner to set tension of the wire.

The tension-setting unit may be a turnbuckle.

The ship mooring device may include: a first sensor unit installed at the elastic member of the wires and configured to sense pressure on the elastic member.

The ship mooring device may include: a second sensor unit provided such that at least one second sensor unit is installed in each of the hinge joints of the main body and to sense rotating rates and rotating amounts of the frames with respect to the hinge joint.

The ship mooring device may include: a signal output unit installed at the main body and connected to the first sensor unit, the signal output unit being configured such that, when a value measured by the first sensor unit is out of a preset range, the signal output unit outputs a preset signal to an outside.

The ship mooring device may include: a controller installed at the main body and connected to the first sensor unit and the second sensor unit, and configured to calculate values measured by the first and second sensor units to obtain ocean information of at least one of wind, ocean current, and wave power.

The ship mooring device may include: an image-capturing unit installed at the main body and configured to capture an image of the wire, wherein the controller may detect the image captured by the image-capturing unit and determine information about separation of the ship by image recognition performed by a pre-stored image-processing program.

The ship mooring device may include: a data communication unit installed at the main body and connected to the controller for communication with at least one of an external mobile terminal and a control center, and transmitting/ receiving results calculated and determined by the controller to/from at least one of the external mobile terminal and the control center.

Advantageous Effects

As described above, according to the present invention, the ship mooring device is configured to install the wires in the frames, the wires having the elastic member to provide the dynamic stability acting in both the contractile and tensile directions to the frames, and the frames being foldable using a spring bellows structure and configured to connect the ship and the pier together. Accordingly, the ship mooring device can be easily installed in a narrow space and more firmly moor a ship.

In addition, the ship mooring device has the tension-setting unit that is configured to easily set the tension of the wire by adjusting its own length. Accordingly, the mooring force can be freely controlled in response to the specifications of various ships to be moored. Furthermore, the ship mooring device has the sensor units configured to sense the variation of tension and the movements of the frames in real time, and has the controller configured to obtain a variety of ocean information and information about separation of the ship using sensed results. Accordingly, it is possible to significantly increase the utilization and realize application to a model test.

BEST MODE

Mode for Invention

Figure 1:
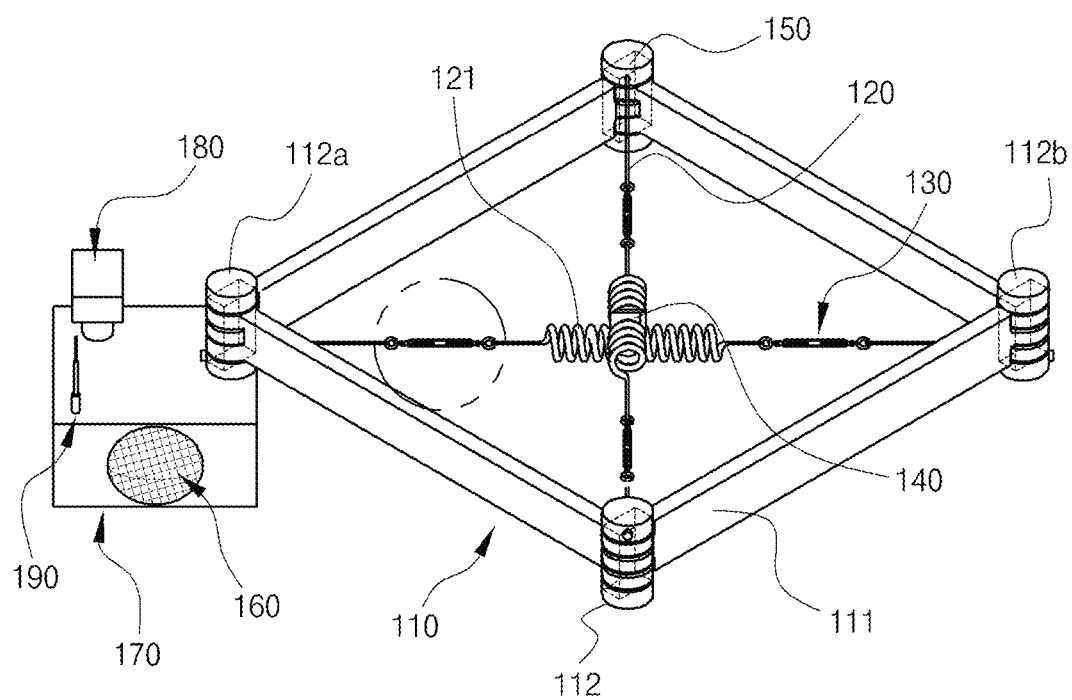
FIG. 1 is a perspective view showing a ship mooring device using a spring bellows structure according to an embodiment of the present invention.

An embodiment of the present invention will be described in detail with reference to the accompanying drawings. The embodiment will be described in detail in order to allow those skilled in the art to practice the present invention. It should be appreciated that various embodiments of the present invention are different, but are not necessarily exclusive. For example, specific shapes, configurations, and characteristics described in an embodiment of the present invention may be implemented in another embodiment without departing from the technical spirit and the scope of the present invention. In addition, it should be understood that positions and arrangements of individual components in the embodiment may be changed without departing from the technical spirit and the scope of the present invention. Therefore, the detailed description provided below should not be construed as being restrictive. In addition, the scope of the present invention is defined only by the accompanying claims and their equivalents if appropriate. The same reference numerals throughout the drawings denote elements having the same or similar function.

Hereinbelow, an exemplary embodiment of the present invention will be described in detail with reference to the accompanying drawings such that the invention can be easily embodied by those skilled in the art to which this invention belongs.

Figure 2:
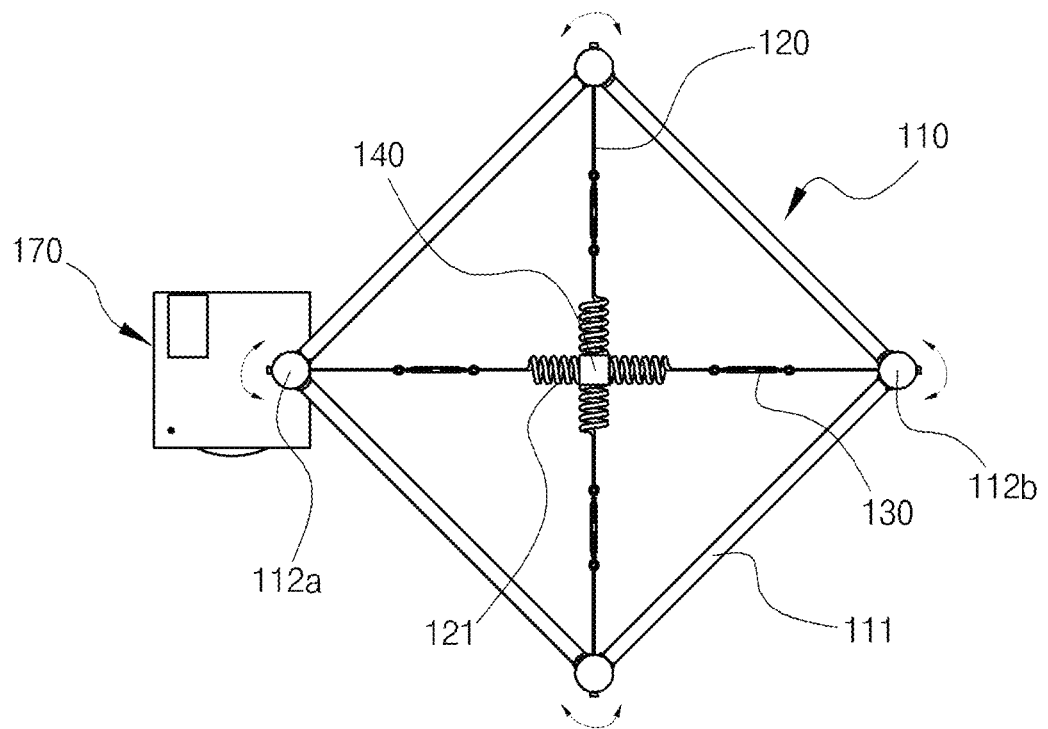
FIGS. 2 to 4 are plane, front, and side views, showing the ship mooring device.
Figure 3:
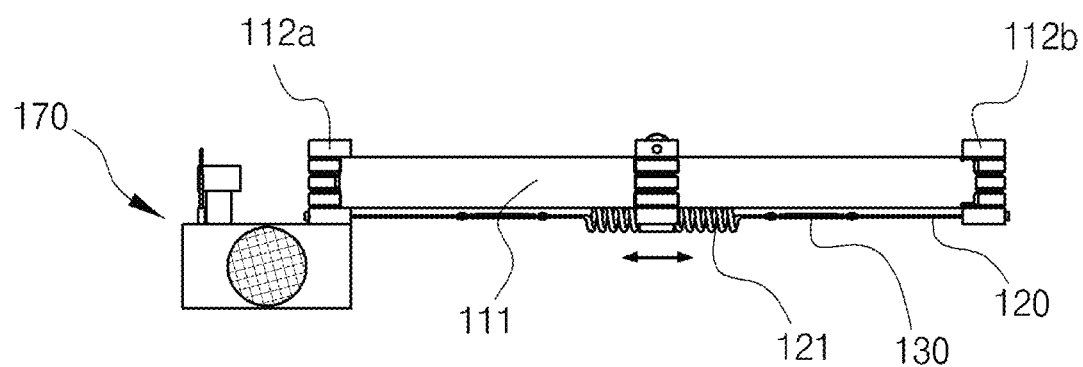
Figure 4:
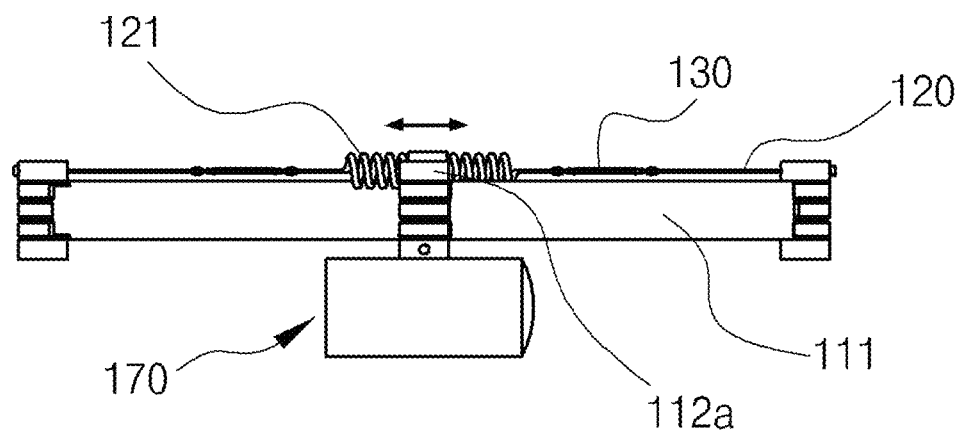
Figure 5:
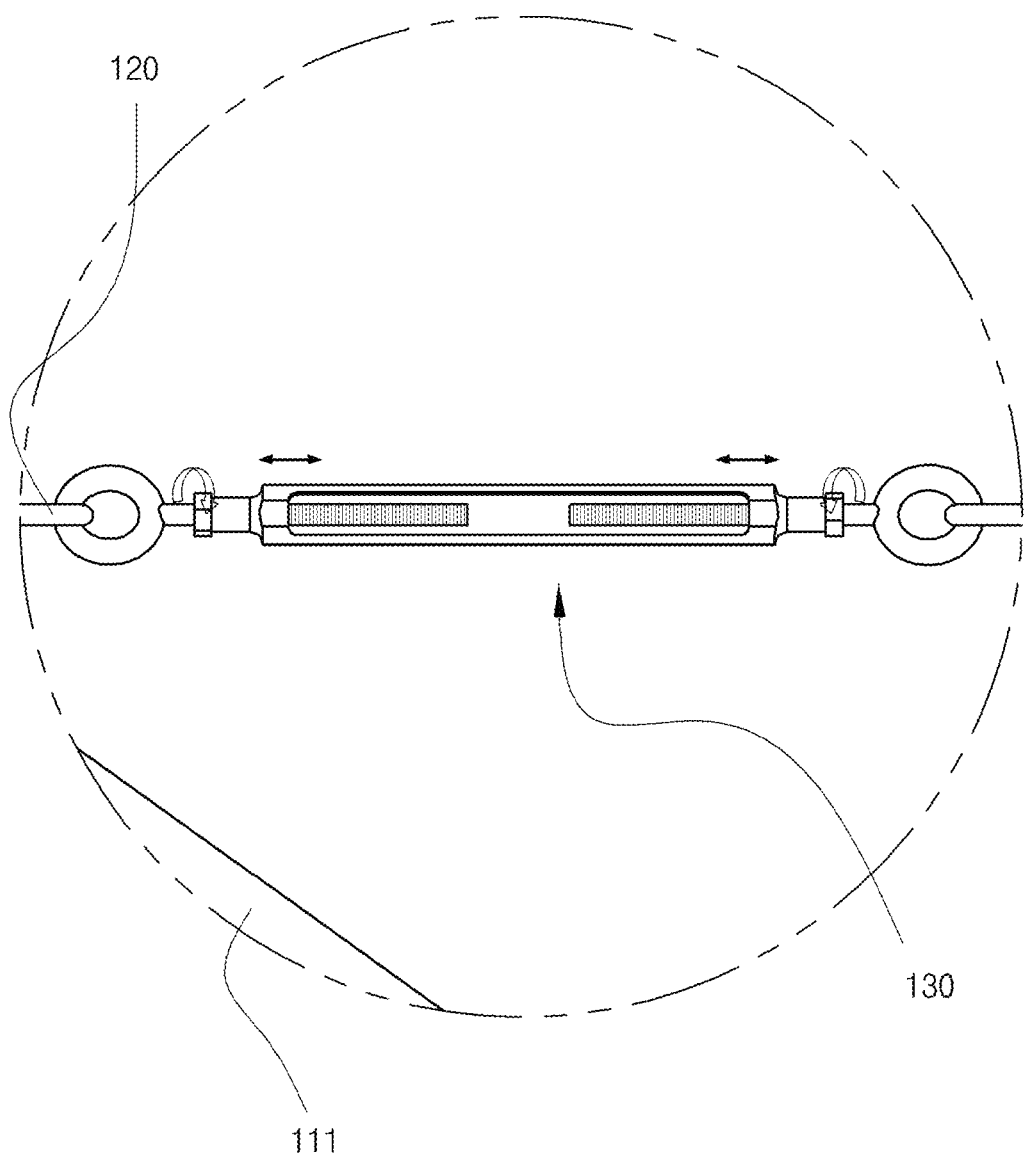
FIG. 5 is a partially enlarged view showing a tension-setting unit of the ship mooring device.
Figure 6:
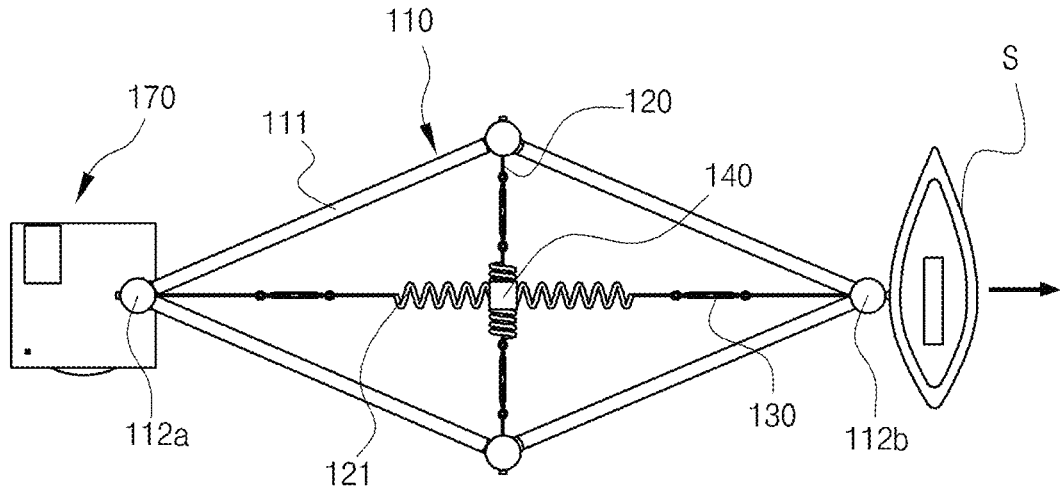
FIGS. 6 and 7 are views showing operations of a dynamic stability on the X-axis of the ship mooring device.
Figure 7:
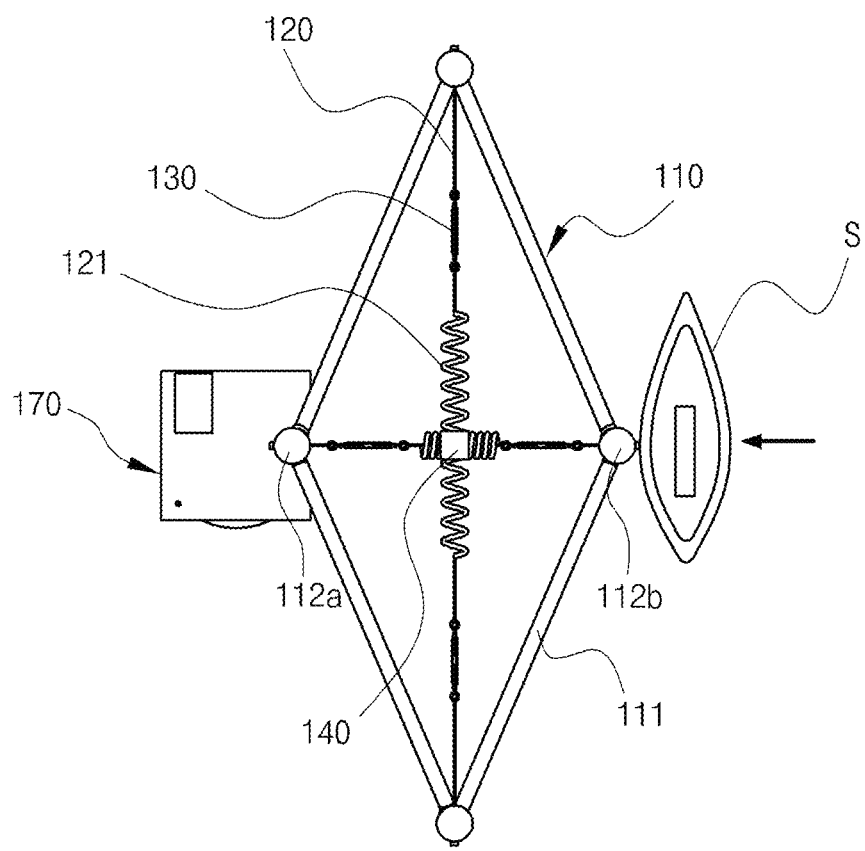
Figure 8:
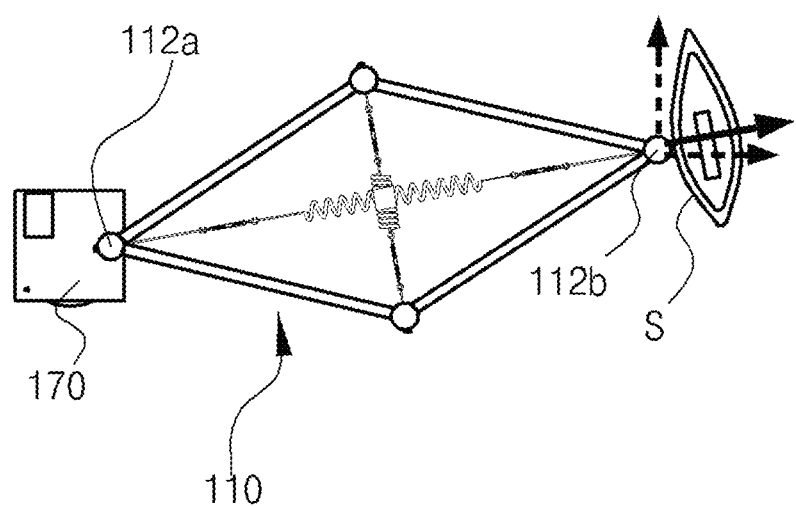
FIGS. 8 to 11 are views showing operations of the dynamic stability on the X-axis and Y-axis of the ship mooring device.
Figure 9:
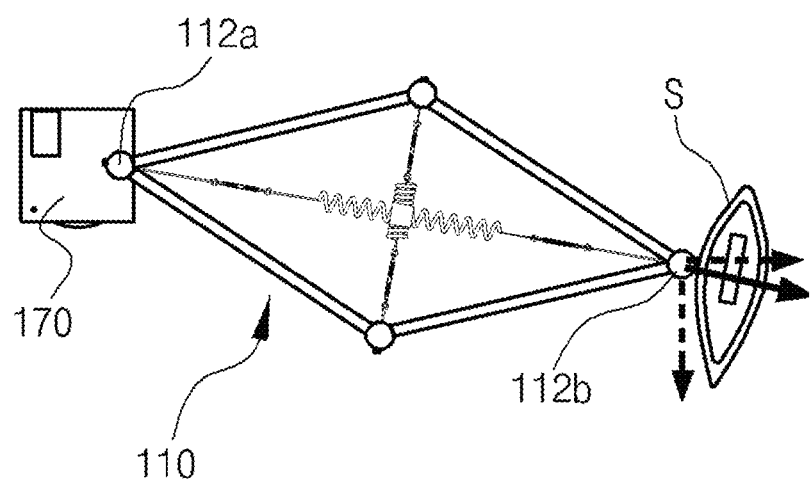
Figure 10:
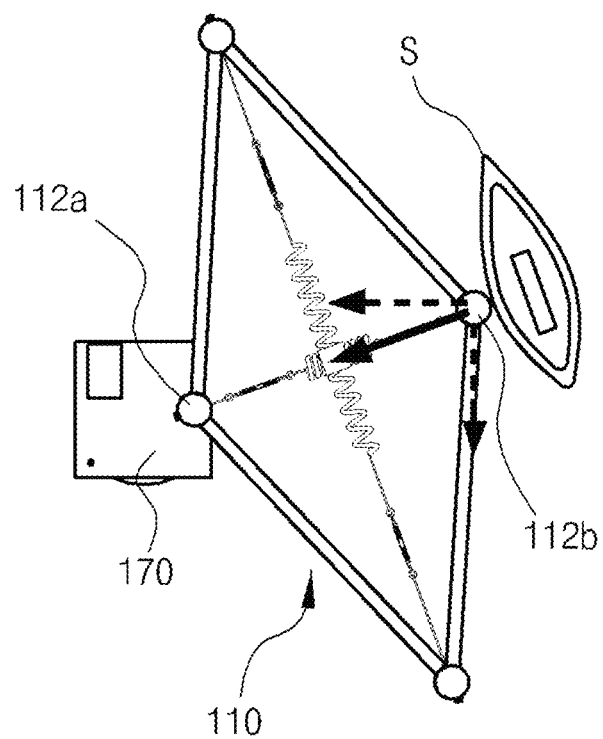
Figure 11:
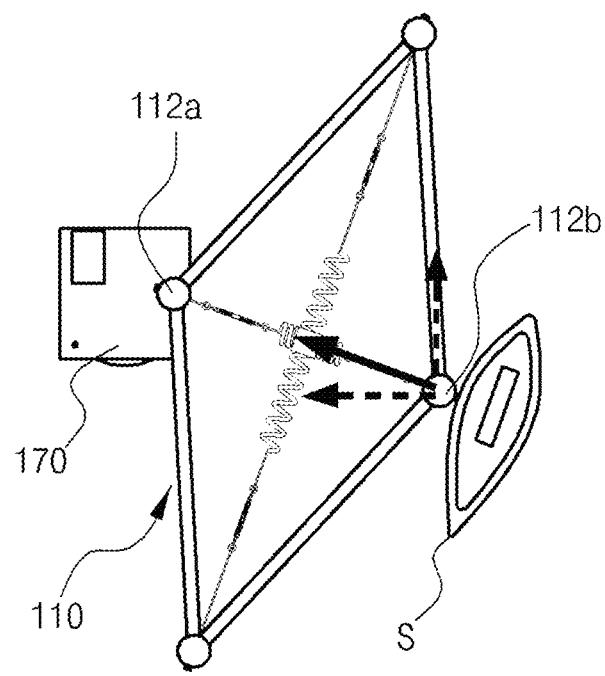
Figure 12:
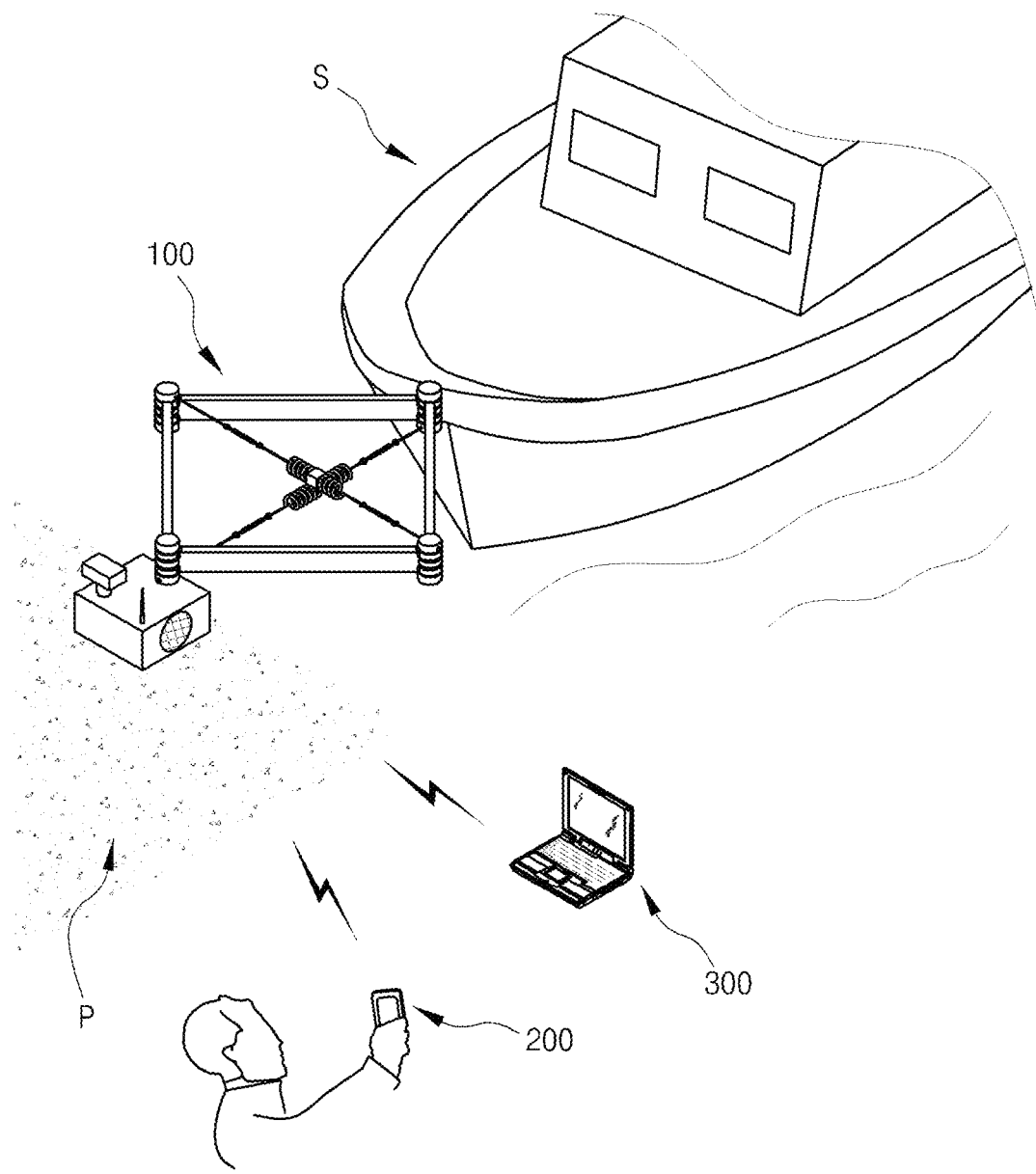
FIG. 12 is a view showing an example of use of the ship mooring device.
Figure 13:
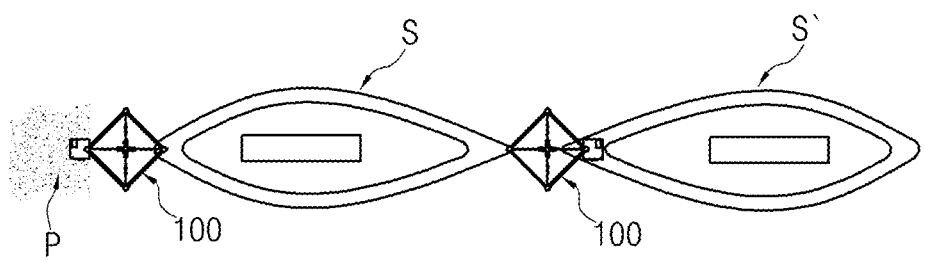
FIGS. 13 to 15 are views showing examples of application of the ship mooring device.
Figure 14:
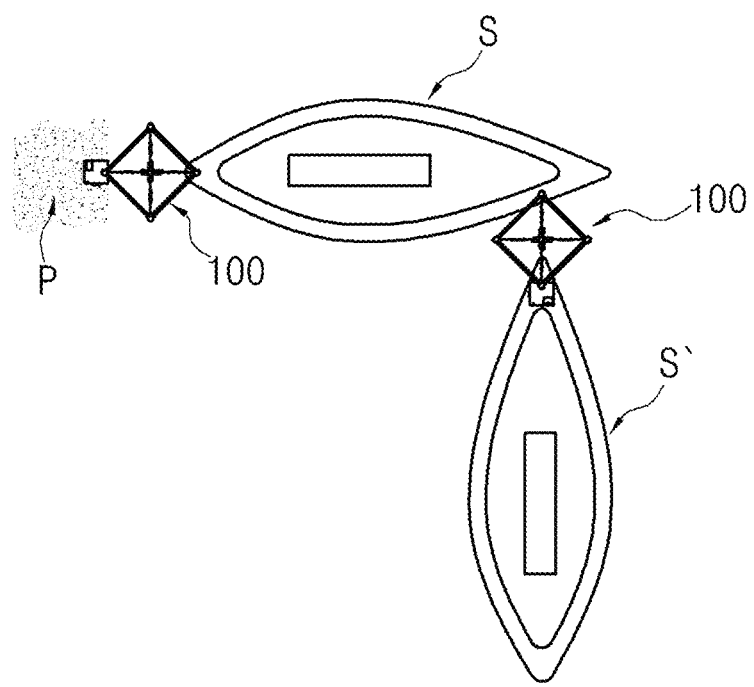
Figure 15:
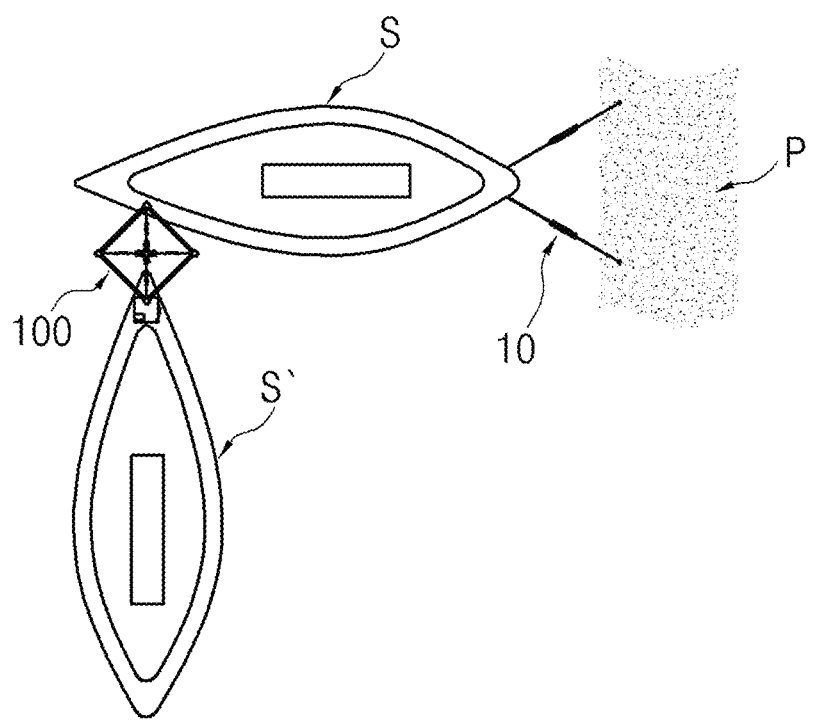

FIG. 1 is a perspective view showing a ship mooring device using a spring bellows structure according to an embodiment of the present invention; FIGS. 2 to 4 are plane, front, and side views, showing the ship mooring device; FIG. 5 is a partially enlarged view showing a tension-setting unit of the ship mooring device; FIGS. 6 and 7 are views showing operations of a dynamic stability on the X-axis of the ship mooring device; FIGS. 8 to 11 are views showing operations of the dynamic stability on the X-axis and Y-axis of the ship mooring device; FIG. 12 is a view showing an example of use of the ship mooring device; and FIGS. 13 to 15 are views showing examples of application of the ship mooring device.

As showing in FIGS. 1 to 15, as a device temporarily or permanently fixing a state in which a ship S is spaced at a preset distance from another ship S' or a pier P, a mooring device 100 for a ship using a spring bellows structure according to the present invention may include: a main body 110, a wire 120, a tension-setting unit 130, a first sensor unit 140, a second sensor unit 150, a signal output unit 160, a controller 170, an image-capturing unit 180, and a data communication unit 190.

According to the present invention, the main body 110 may be configured of a plurality of frames 111 in which opposite ends of each of the frames are hinge-coupled to facing ends of adjacent frames to form foldable hinge joints. The frames 111 are configured such that one side is fixed to the ship S and the other side in a diagonal direction is fixed to the pier P to connect the ship S and the pier P together. Thus, the frames 111 are configured to fix all components to be described below and maintain overall shape of the device. More preferably, the main body 110 may be manufactured in a rhombus shape configured of four frames 111 and four hinge joints 112.

Diagonally opposed non-adjacent hinge joints 112a and 112b of the main body 110 may be fixed to the ship S and the pier P, respectively, by a fixing member or fastening member (not shown). In the present invention, a hinge joint 112 fixed to the pier P will be referred to as a fixed hinge 112a, and a hinge joint 112 fixed to the ship S and moved in response to the movement of the ship S will be referred to as a moving hinge 112b.

According to the present invention, in order to prevent damages of the frames 111 by allowing displacement by the movement of the ship S in a vertical direction (direction of Z-axis), the main body 110 may be manufactured such that the fixed hinge 112a and the moving hinge 112b have a ball joint structure. The ball joint structure is a general known art, so detailed description and drawing thereof will be omitted.

A plurality of wires 120 is configured to generate a predetermined dynamic stability according to the movement of the ship S by a variety of environment conditions such as wind, ocean current, and wave power. The plurality of wires 120 is installed inward in diagonal lines with respect to the frames 111 of the main body 110 to connect the diagonally opposed non-adjacent hinge joints 112 together, with an elastic member 121 interposed in the center portion in the lengthwise sense of the wires to generate the predetermined dynamic stability in response to the movement of the ship.

The plurality of wires 120 may be provided to connect the diametrically opposed non-adjacent hinge joints 112 together, and has the dynamic stability in a manner that, while crossing at different heights from each other, some of wires 120 become extended and the remain wires 120 contract.

According to the embodiment of the present invention in which the main body is configured of the four frames 111 and the four hinge joints, it is preferable that the main body has two wires 120. Although the wires 120 are configured to have an elastic force by the separate elastic member 121 in the present invention, but each wire 120 may be manufactured to have the elastic force internally, and various known springs may be applied thereto.

The tension-setting unit 130 is configured to adjust tension of the wire 120 by varying the length by itself. The tension-setting unit 130 is installed at each wire 120 along a longitudinal direction of the wire 120 in a self-length adjustable manner to set initial tension of the wire 120.

Preferably, the tension-setting unit 130 may be a turnbuckle and may be installed at each wire 120 extended to opposite sides based on the elastic member 121 for balanced tension adjustment. However, the present invention is not limited thereto, and various length adjustment members may be used within the technical scope of the present invention.

The turnbuckle is configured of a body provided with a through-hole nut, and rod screws provided at left and right sides of the body and having screw portions at first sides coupled to each other through the through-hole nut and second sides coupled to two points of application, respectively. When the through-hole nut is rotated in a preset direction, the opposed rod screws come close to each other, and when the through-hole nut is rotated in the opposite direction, the screws are moved far away from each other. By using this operation, the tension between the two points of application is controlled.

That is, through the self-adjustment of length, the tension-setting unit 130 may control the tension of the wire 120, that is, a mooring force of the wire 120 with respect to the ship S. Whereby, the tension-setting unit 130 may set initial tensions suitable for specifications of various ships to be moored.

The first sensor unit 140 is configured to sense a degree of tension applied to the wires 120 in real time, the tension being generated due to movements of the frames 111 when the ship S is moved. According to the present invention, the first sensor unit 140 is installed at the elastic member 121 of the wires 120 and be configured to sense pressure on the elastic member 121.

The first sensor unit 140 may be an electronic pressure sensor such as a strain gauge, a pressure gauge, a load cell, a pressure transmitter, and a semiconductor pressure device. However, the present invention is not limited thereto, and various known pressure sensors or manometers may be used by those skilled in the art within the technical scope of the present invention.

The second sensor unit 150 is configured to sense movements of the frames 111 when the ship S is moved. The second sensor unit 150 is installed at the fixed hinge 112a or the moving hinge 112b of the main body 110 to senses rotating amounts and rotating rates of the frames 111 with respect to the hinge joint 112.

In addition, according to the present invention, the second sensor unit 150 may be installed in each of the hinge joints 112 to sense the movements of the frames 111 more accurately and with high reliability.

The second sensor unit 150 is preferably an electronic rotation sensor, but may be various known rotation sensors using power generation, oscillation, photoelectric, the Hall Effect, magnetoresistance, and the like. Moreover, the present invention is not limited thereto, and various known tachometers such as a revolution counter using a gear, a revolution speed counter using a magnetic field, electricity, and a timer, and the like may be used by those skilled in the art within the technical scope of the present invention.

The signal output unit 160 is provided to inform a user of whether the ship S is separated from the pier P or the main body 110. The signal output unit 160 may be installed at the main body 110 and connected to the first sensor unit 140. The signal output unit 160 may be configured such that, when a value measured by the first sensor unit 140 is out of a preset range, the signal output unit 160 outputs a preset signal to the outside.

The signal output unit 160 may be various known speaker devices configured to output a set sound so that the user can recognize acoustically. However, as signal output unit 160, various known display devices each configured to output set characters through a screen such as a liquid crystal display so that the user can recognize visually.

The controller 170 is a calculation control module. The controller is configured to calculate values measured by first and second sensor units 140 and 150 to obtain ocean information of wind, ocean current, wave power, and the like. The controller 170 may be installed at the main body 110 and connected to the first and second sensor units 140 and 150.

A basic operation expression corresponding to each ocean information may be pre-stored in the controller 170. Furthermore, those skilled in the art may freely design the controller 170 by using various known control modules within the technical range of the present invention.

More specifically, the first and second sensor units 140 and 150 may measure a degree of tension applied to the wire 120 and a degree of rotation of the frame 111 on the basis of the hinge joint 112. The variation of values measured by the first and second sensor units 140 and 150 mean the movement of the ship S on the sea, and the measured values may be indicators from which windy pattern, current condition, and degree of wave power are inferred.

Thus, the controller 170 may obtain a variety of ocean information including wind, ocean current, wave power, and the like by calculating the indicators through the preset operation expression.

The image-capturing unit 180 is configured to capture images required to determine whether the ship S is separated from the pier P or the main body 110, and whether the main body 110, the wires 120, and the tension-setting unit 130 are broken down. The image-capturing unit 180 is installed at the main body 110 to capture images of the main body 110, the wires 120, and the tension-setting unit 130.

Preferably, the image-capturing unit 180 may be an image sensor such as a charge coupled device (CCD) sensor or a complementary metal oxide semiconductor (CMOS) sensor each having waterproof function. However, the present invention is not limited thereto, various known camera devices may be used within the technical range of the present invention.

The controller 170 may be configured to detect images captured by the image-capturing unit 180 and to determine information about separation of the ship and trouble information by image recognition performed by a pre-stored image-processing program.

The image-processing program may perform recognition for an object as follows. The image-processing program may detect similarity on the basis of movement displacements and angular displacements of the pixels defined by the vector; use edges such as boundary lines or outlines of the object, or lines or curves that approximate outlines of the object; use marginal points in an image, invariant points, or invariant feature points with respect to rotational transform or sizing transform; or extract feature points of the object included in an image.

The data communication unit 190 is configured to receive data obtained by the controller 170 from an external mobile terminal 200 and a control center 300. The data communication unit 190 may be installed at the main body 110 to be connected to the controller 170 for communication with the mobile terminal 200 and the control center 300. In addition, the data communication unit 190 may function to transmit/receive results calculated and determined by the controller 170 to/from the mobile terminal 200 and the control center 300.

That is, the results drawn by the controller 170 are visually displayed on the liquid crystal of the mobile terminal 200 or a monitor of the control center 300 by the data communication unit 190, thereby providing monitoring environment that is convenient for the user.

Meanwhile, as shown in FIGS. 13 to 15, the ship mooring device 100 for a ship of the present invention having the above-described configuration may be provided as a plurality of mooring devices. Further, the ship mooring device 100 may be used in simultaneous connection of the ship S, a ship S', and the pier P, and used in combination with a conventional mooring device 10 using a soft spring and the like.

According to the present invention, the ship mooring device 100 for a ship using a spring bellows structure includes the wires 120 provided with the elastic member 121, so that dynamic stability is applied, in both the contractile and tensile directions, to the frames 111 that may be configured in the foldable manner and connect the ship S and the pier P together. Thus, the ship mooring device 100 can be easily installed even in a narrow space, and can more firmly moor the ship S.

The ship mooring device 100 includes the tension-setting unit 130 that easily sets the tension of the wire 120 by adjusting its own length, thus freely controlling the mooring force in response to the specifications of various ships to be moored. Further, the ship mooring device 100 includes the sensor units 140 and 150 that sense the variation of tension and the movements of the frames 111 in real time and the controller 170 obtaining the ocean information and the information about separation of the ship using the sensed results, thus significantly increasing the utilization and being applicable to a model test.

Although the present invention has been described on the basis of the preferred embodiment, the technical spirit of the present invention is not limited thereto. Those skilled in the art will appreciate that various modifications, additions, and substitutions are possible within the range disclosed in the claims, and the modifications, additions and substitutions will belong to the accompanying claims.

DESCRIPTION OF REFERENCE NUMERALS

S: ship
P: pier
10: conventional mooring device
100: ship mooring device
110: main body
111: frame
112: hinge joint
112a: fixed hinge
112b: moving hinge
120: wire
121: elastic member
130: tension-setting unit
140: first sensor unit
150: second sensor unit
160: signal output unit
170: controller
180: image-capturing unit
190: data communication unit
200: mobile terminal
300: control center

INDUSTRIAL APPLICABILITY

According to the present invention, the ship mooring device includes the wires provided with the elastic member to provide the dynamic stability acting in both the contractile and tensile directions to the frames that are configured in the foldable manner and connect the ship and the pier together. Thus, the ship mooring device may be easily installed even in a narrow space, and more firmly moor the ship. The ship mooring device includes the tension-setting unit that easily set the tension of the wire by adjusting its own length, thus freely controlling the mooring force in response to the specifications of various ships to be moored. Furthermore, the ship mooring device includes the sensor units that sense the variation of tension and the movements of the frames in real time and the controller obtaining the ocean information and the information about separation of the ship using the sensed results, thus significantly increasing the utilization and being applicable to the model test. Accordingly, the ship mooring device may be effective in the field of ship mooring device.

What is claimed is:

1. A ship mooring device using a spring bellows structure, wherein the ship mooring device temporarily or permanently fixes a state in which the ship is spaced at a preset distance from a vessel or a pier, the ship mooring device comprising: a main body configured of a plurality of frames in which opposite ends of each of the frames are hinge-coupled to facing ends of adjacent frames to form foldable hinge joints, wherein diagonally opposed non-adjacent hinge joints of the frames are fixed to the ship and the pier, respectively; and a plurality of wires which are installed inwards in diagonal lines with respect to the frames of the main body to connect the diagonally opposed non-adjacent hinge joints together, with an elastic member interposed in a center portion of the plurality of wires to generate predetermined dynamic stability when the ship is moved, wherein the plurality of wires is provided to connect the diagonally opposed non-adjacent hinge joints together, and generates the dynamic stability in a manner that, while crossing at different heights from each other, some of the wires extend and the remaining wires contract.

2. The ship mooring device of claim 1, wherein the hinge joints of the main body are manufactured in ball joint structures.

3. The ship mooring device of claim 1, further comprising:

a tension-setting unit installed at each of the wires along a longitudinal direction thereof in a self-length adjustable manner to set tension of the wire.

4. The ship mooring device of claim 3, wherein the tension-setting unit is a turnbuckle.

5. The ship mooring device of claim 1, further comprising:
a first sensor unit installed at the elastic member of the wires and configured to sense pressure on the elastic member.

6. The ship mooring device of claim 5, further comprising:
a second sensor unit provided such that at least one second sensor unit is installed in each of the hinge joints of the main body and to sense rotating rates and rotating amounts of the frames with respect to the hinge joint.

7. The ship mooring device of claim 5, further comprising:
a signal output unit installed at the main body and connected to the first sensor unit, the signal output unit being configured such that, when a value measured by the first sensor unit is out of a preset range, the signal output unit outputs a preset signal to an outside.

8. The ship mooring device of claim 6, further comprising:
a controller installed at the main body and connected to the first sensor unit and the second sensor unit, and
configured to calculate values measured by the first and second sensor units to obtain ocean information of at least one of wind, ocean current, and wave power.

9. The ship mooring device of claim 8, further comprising:
an image-capturing unit installed at the main body and configured to capture an image of the wire,
wherein the controller detects the image captured by the image-capturing unit and determines information about separation of the ship by image recognition performed by a pre-stored image-processing program.

10. The ship mooring device of claim 9, further comprising:
a data communication unit installed at the main body and connected to the controller for communication with at least one of an external mobile terminal and a control center, and transmitting/receiving results calculated and determined by the controller to/from at least one of the external mobile terminal and the control center.

* * * * *